J. REYNOLDS.
MACHINE FOR MAKING TUBES OF PLASTIC MATERIAL.
No. 8,051. Patented Apr. 22, 1851.
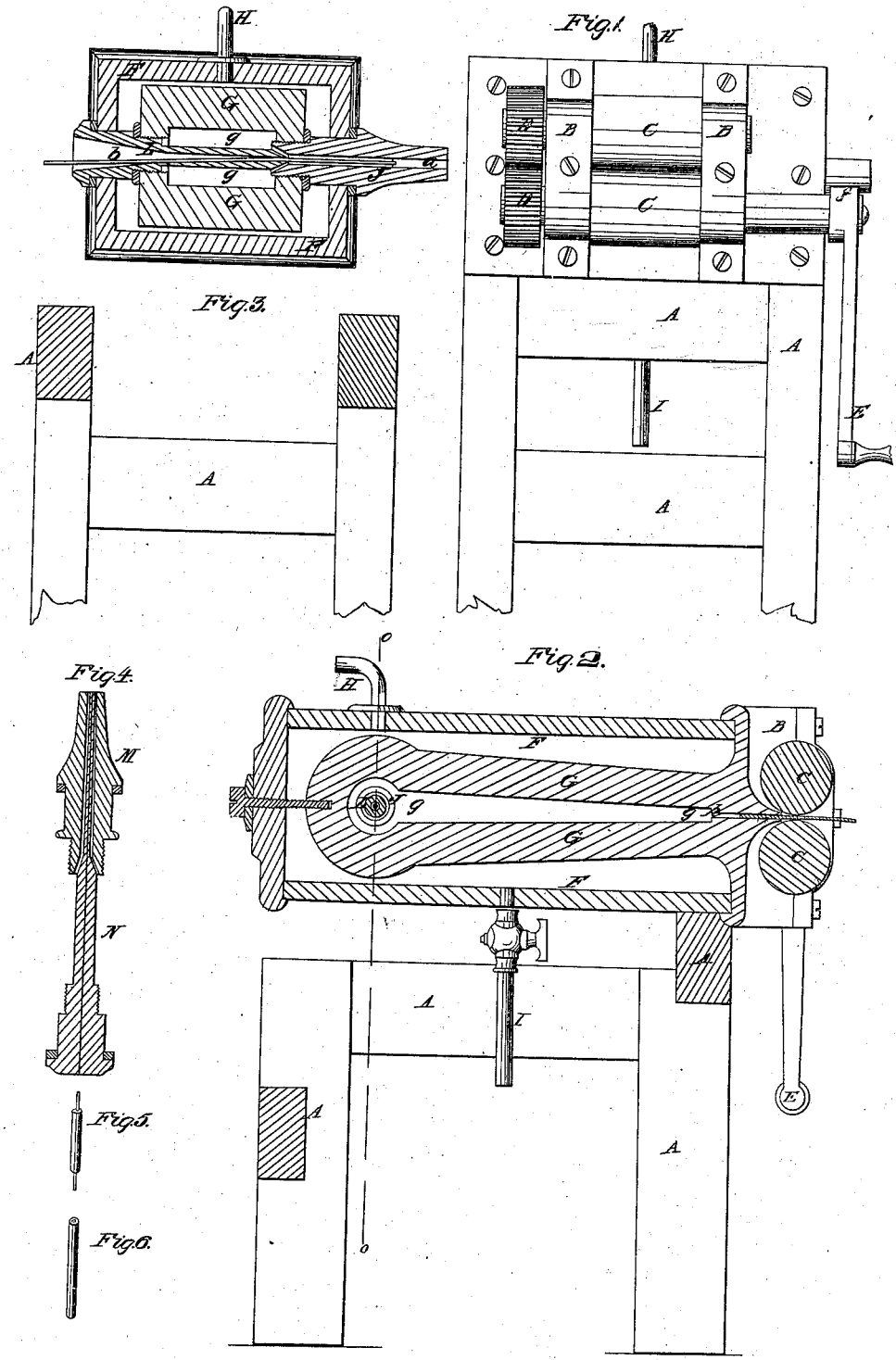

UNITED STATES PATENT OFFICE.

JAMES REYNOLDS, OF NEW YORK, N. Y.

MACHINE FOR GUTTA-PERCHA TUBING AND COVERING WIRE.

Specification of Letters Patent No. 8,051, dated April 22, 1851.

*To all whom it may concern:*

Be it known that I, JAMES REYNOLDS, of the city, county, and State of New York, have invented new and useful Improvements on the Machinery or Apparatus for Making Hose or Tubes of any Plastic Material and for Insulating Telegraphic or other Wires; and I do hereby declare that the following is a full, clear, and exact description of the same, reference being had to the accompanying drawings, forming part of this specification, in which—

Figure 1, is a front elevation. Fig. 2, is a longitudinal section. Fig. 3, is a transverse section in direction of the line $o, o$, Fig. 2. Fig. 4, is a longitudinal section in detail, of the core or mandrel and mold tube, in the formation of hose. Fig. 5, represents an insulating tube containing wire, in illustration of the operation of the machine. Fig. 6, represents another tube or hose, having no wire within it and of less thickness or larger internal diameter than the tube represented in Fig. 5.

The same letters of reference denote similar parts throughout each of the several figures.

The nature of my invention refers to the formation of tubes of any plastic material with or without wires through them, and consists, in reducing to a fluid, or partly fluid, state, by the application of heat, a band or strip of the plastic substance, which is fed into the stomach of the machine by friction rollers, and delivered through a suitable mold tube, that, together with its mandrel, or wire guide, are situated at right angles, or other similar position, with relation to the feed rollers.

To enable others skilled in the art to make and use my invention I will proceed to describe its construction and operation.

A, A, A, A, is the frame of the machine, with cheeks or projections, B, B, in which work feed rollers C, C, having pinions D, D, and driven by handle E, worked by hand, steam, or other power in any suitable way: the rollers C, C, may be notched, grooved, or smooth, according to the substance they feed or operate on, and are set at a proper distance apart, so as to bite on the material being fed.

F, F, is a stomach or internal vessel having a cavity or interior space $g, g$, and lip or mouth $h$, (Fig. 2), which projects outward, being of the same breadth as the rollers C, C, and forming a continuation of the space between them, the edges or ends of the metal projection forming the mouth $h$, butting up against the rollers C, C.

H, is a steam pipe for admitting steam from a boiler to the interior of the case F, F, and surrounding the stomach G, G, (or the pipe H may serve to conduct any other treated medium, such as air or water, instead of steam, if preferred).

I, is a condensation or escape pipe for the steam, or condensed water to pass off by, when required.

J, is the tube mold passing through one side of the case, F, F, and screwed into, or entering and secured to, the stomach G, G; its bore or circular cavity $a$, is of the required diameter of the tube to be made, and its interior mouth or end, of a conical and enlarged form, as seen in Fig. 3.

L, is a wire guide used when forming insulating tubes, it passes through the side of the case F, F, and stomach G, G, to which it is screwed or secured, being situated opposite the tube J, and is made of a conical form, at its interior end, of less diameter than, but corresponding to, and partly entering, the conical space or mouth of the passage $a$, of the tube J; and is constructed with a circular passage $b$ (Fig. 3), of suitable shape, the center of which, is in the same line as the center of the passage $a$.

M, (Fig. 4,) is a tube mold, similar to the mold J, and fitting in the same cavities through the outer case F, F, and stomach G, G; and N, (Fig. 4) is a mandrel, or core, being similar to the wire guide L, having a passage lengthwise through it for supplying the tube with air to prevent collapse, and its inner end prolongated, being of smaller diameter than, and passing up, the tubular passage of the mold M; the mandrel N, fitting in the place occupied by the wire guide L. The tube mold M, and mandrel N, are used for making hose or tubes, having no wire within them, in a similar manner to the mold J, and wire guide L, used for making insulating tube containing wire. The mandrel N, being a modification of the guide L, and the tube mold M, being the same as the mold J, and operating in a similar manner.

The operation is as follows. The substance of which the tube is to be made (and which may be gutta percha, or any other plastic material) being previously cut, or rolled, in the shape of a band, is held or forced up to the feed rollers C, C, which by turning the handle E, and through pinions D, D, are put in motion, biting and drawing in between them, the plastic substance, which enters the mouth $h$, (as seen in Fig. 2,) and so passes on to the space $g$, $g$, of the stomach G, G, where it is melted or made soft or fluid (as seen in Fig. 3,), through the steam or heated medium in the interior of the outer case F, F, and surrounding the stomach G, G, which it heats. When the space $g$, $g$, is full of the plastic material, reduced, by the application of heat as described, from its form as a band, to a fluid or softened mass, the band being still drawn in by the rollers C, C, causes, a pressure to be thrown upon, and multiplied over the mass in the space $g$, $g$, which is thus rendered firm, and forced out through the passage in the tube mold J; and if the wire guide L, be used and wire, simultaneously, be fed through L, (as seen in Fig. 3,) the plastic material entering around the conical point of the guide L, will surround and cover the wire, and be delivered at the external extremity of the mold J, as an insulating tube containing the wire, and as represented by Fig. 5; or if the mandrel for core N, and tube mold M, be used, the plastic substance will be forced out in the same way, entering the passage of the tube mold M, and lapping over the prolongated part of the mandrel N, which projects up the passage of the tube mold M, and forms the caliber or internal diameter of the tube or hose, its thickness or strength being proportioned according to the relative diameters of the passage through the mold M, and the prolongated part of the mandrel N, situated concentrically within it; the material forming the hose being cooled before leaving the mold M, and being delivered in form of a tube or hose similar to that represented by Fig. 6.

As the tube or hose is thus formed, and delivered, at right angles with the line in which the material is fed to the machine, the grain or fiber of the band, lying in direction of its length, (or so produced by the macerating process to which it may be subjected), a twist is formed in the production of the tube or hose, which imparts greater strength and renders it less liable to split or open, than when the tube is formed of fibers lying in direction of its length. Also by the arrangement of the stomach as shown and described, its lip $h$, projecting outward up to the rollers C, C, air is excluded from entering the space $g$, $g$, along with the band, thus avoiding air cells, and by the pressure produced in the mode of feeding, forming a sound and strong hose or tube. Likewise the arrangement of feeding, by rollers C, C, and using bands of plastic material enables, the supply to the feed being regulated, according to the required length of tube, and at any suitable speed, according to the heat operating in reducing the material to a soft, or fluid, state; thus showing many, and great, advantages over the ordinary arrangements.

What I claim as my invention and desire to secure by Letters Patent is—

The use, for the purposes specified, of feed rollers C, C, in combination with a stomach G, G, having a lip or mouth $h$, arranged and operating, substantially as shown and described.

In testimony whereof I have hereunto signed my name before two subscribing witnesses this 20th day of December 1850.

JAMES REYNOLDS.

Witnesses:
O. D. MUNN,
R. W. FENWICK.